(12) United States Patent
Liao et al.

(10) Patent No.: US 8,982,312 B2
(45) Date of Patent: Mar. 17, 2015

(54) 2D AND 3D SWITCHABLE DISPLAY DEVICE AND LIQUID CRYSTAL LENTICULAR LENS THEREOF

(71) Applicant: AU Optronics Corp., Hsin-Chu (TW)

(72) Inventors: Shu-Wen Liao, Hsin-Chu (TW);
Tzu-Fang Huang, Hsin-Chu (TW);
Wan-Ting Chen, Hsin-Chu (TW);
Sheng-Ju Ho, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 145 days.

(21) Appl. No.: 13/920,079

(22) Filed: Jun. 17, 2013

(65) Prior Publication Data

US 2014/0204292 A1    Jul. 24, 2014

(30) Foreign Application Priority Data

Jan. 21, 2013    (TW) .............................. 102102224 A

(51) Int. Cl.
| G02F 1/1335 | (2006.01) |
| G02B 27/22 | (2006.01) |
| H04N 13/04 | (2006.01) |
| G02F 1/1343 | (2006.01) |
| G02F 1/29 | (2006.01) |

(52) U.S. Cl.
CPC ........ G02B 27/2214 (2013.01); H04N 13/0404 (2013.01); H04N 13/0452 (2013.01); G02F 1/134309 (2013.01); G02F 2001/294 (2013.01)
USPC .............................. 349/200; 349/15; 349/95

(58) Field of Classification Search
USPC .............................................. 349/15, 95, 200
See application file for complete search history.

(56) References Cited

U.S. PATENT DOCUMENTS

| 4,572,616 A * | 2/1986 | Kowel et al. .................. 349/200 |
| 5,583,674 A | 12/1996 | Mosley |
| 2011/0102689 A1 | 5/2011 | Chiu |
| 2012/0069255 A1 | 3/2012 | Takagi |

FOREIGN PATENT DOCUMENTS

TW    201115221    5/2011

* cited by examiner

*Primary Examiner* — Dung Nguyen
(74) *Attorney, Agent, or Firm* — Winston Hsu; Scott Margo

(57) ABSTRACT

The present invention provides a liquid crystal lenticular lens including a first substrate, a second substrate, a liquid crystal layer, two first electrodes, two second electrodes, and a common electrode. The second substrate and the first substrate are disposed opposite to each other. The liquid crystal layer is disposed between the first substrate and the second substrate, and the liquid crystal layer has an ordinary refractive index and an extraordinary refractive index. The first electrodes and the second electrodes are disposed between the first substrate and the liquid crystal layer, and the second electrodes are disposed between the first electrodes. The common electrode is disposed between the second substrate and the liquid crystal layer.

15 Claims, 10 Drawing Sheets

2D AND 3D SWITCHABLE DISPLAY DEVICE AND LIQUID CRYSTAL LENTICULAR LENS THEREOF

BACKGROUND OF THE INVENTION

1. Field of the Invention

The present invention relates to a two-dimensional and three-dimensional stereoscopic switchable display device and a liquid crystal lenticular lens, and more particularly, to the two-dimensional and three-dimensional stereoscopic switchable display device and the liquid crystal lenticular lens with electrode pattern design of different pitches, thereby decreasing the amount of power sources.

2. Description of the Prior Art

The principle of the stereoscopic display technology includes delivering different images respectively to a left eye and a right eye of a viewer to give to the viewer a feeling of gradation and depth in the images, thereby generating the stereoscopic effect in the cerebrum of the viewer by analyzing and overlapping the images received separately by the left eye and the right eye.

To prevent the parallax barrier of a parallax barrier spatial multiplexing three-dimensional stereoscopic display device from blocking light, a liquid crystal lenticular lens stereoscopic display device is developed to overcome the drawbacks of the conventional three-dimensional stereoscopic display device. Please refer to FIG. 1. FIG. 1 is a schematic diagram illustrating the conventional liquid crystal lenticular lens stereoscopic display device. As shown in FIG. 1, the conventional liquid crystal lenticular lens stereoscopic display device includes a display panel 20 and a liquid crystal lenticular lens 30 disposed on the display panel 20. The liquid crystal lenticular lens 30 includes a first substrate 32, a second substrate 34, an electrode unit 36, a liquid crystal layer 38 and a planar electrode 40. The first substrate 32 is disposed opposite to the second substrate 34. The electrode units 36 are disposed on the side of the first substrate 32 facing the second substrate 34. The electrode unit 36 includes thirteen electrodes 36a. The thirteen electrodes 36a are arranged on the first substrate 32 along a direction in sequence. The liquid crystal layer 38 is disposed between the electrode units 36 and the second substrate 34. The planar electrode 40 is disposed between the liquid crystal layer 38 and the second substrate 34. Moreover, there is a gap between any two of the electrodes 36a adjacent to each other. The ratio of each gap to the width of each of the electrodes is 1:1. Therefore, under a three-dimensional stereoscopic display mode, different voltages are necessary to be applied to the electrodes 36a of the electrode unit respectively. Common voltage is applied to the planar electrode 40. Since voltage varies in different horizontal surface of the liquid crystal layer 38, the liquid crystal molecules in different horizontal surface tend to orient differently—rotate and orient themselves following the electric-field lines—so as to achieve lens effect. However, the conventional liquid crystal lenticular lens 30 requires thirteen power sources to achieve the lens effect similar to that of an ideal lens, and therefore burdens the power source and limits design possibilities.

SUMMARY OF THE INVENTION

It is one of the objectives of the invention to provide a method of fabricating a display device so as to overcome the drawbacks of the conventional techniques.

To achieve the purposes described above, an embodiment of the invention provides a liquid crystal lenticular lens including a first substrate, a second substrate, a liquid crystal layer, two first electrodes, two second electrodes, and a common electrode. The second substrate and the first substrate are disposed opposite to each other. The liquid crystal layer is disposed between the first substrate and the second substrate, and the liquid crystal layer has an ordinary refractive index and an extraordinary refractive index. The first electrodes and the second electrodes are disposed between the first substrate and the liquid crystal layer. The common electrode is disposed between the second substrate and the liquid crystal layer. Each of the first electrodes has a first inner side and a first outer side disposed opposite to the first inner side. The first inner sides face each other. There is a first distance between the first outer sides. There is a first center point between the first outer sides, and the first outer sides are equidistant from the first center point. There is a second distance $G_2$ between the first center point and each of the first inner sides, and second distance $G_2$ satisfies a following relation:

[Formula 1]

$$G_2 = \left[2df(n_e - n_o)\frac{a-1}{a}\right]^{\frac{1}{2}}, \quad (1)$$

where d denotes a maximum thickness of the liquid crystal layer, f denotes a focus of the liquid crystal lenticular lens, $n_e$ denotes the extraordinary refractive index of the liquid crystal layer, $n_o$ denotes the ordinary refractive index of the liquid crystal layer, a denotes a number of equal parts of a whole difference between the extraordinary refractive index of the liquid crystal layer and the ordinary refractive index of the liquid crystal layer, and the number of the equal parts is greater than or equal to 3. The second electrodes are disposed between the first electrodes. Each of the second electrodes has a second inner side and a second outer side disposed opposite to the second inner side. The second inner sides face each other. There is a fourth distance between the second inner sides, and the fourth distance equals one-fourth of the first distance. There is a fifth distance $G_5$ between the first center point and each of the second outer sides, and the fifth distance $G_5$ satisfies a following relation:

[Formula 2]

$$G_5 = \left[2df(n_e - n_o)\frac{1}{a}\right]^{\frac{1}{2}}. \quad (2)$$

To achieve the purposes described above, another embodiment of the invention provides a two-dimensional and three-dimensional stereoscopic switchable display device including a display panel and a liquid crystal lenticular lens. The liquid crystal lenticular lens disposed on display panel includes a first substrate, a second substrate, a liquid crystal layer, a plurality of electrode units, and a common electrode. The second substrate and the first substrate are disposed opposite to each other. The liquid crystal layer is disposed between the first substrate and the second substrate, and the liquid crystal layer has an ordinary refractive index and an extraordinary refractive index. The electrode units are disposed between the first substrate and the liquid crystal layer. The common electrode is disposed between the second substrate and the liquid crystal layer. Each of the electrode units includes two first electrodes and two second electrodes. Each of the first electrodes has a first inner side and a first outer side disposed opposite to the first inner side. The first inner sides face each other. There is a first distance between the first outer sides. There is a first center point between the first outer sides, and the first outer sides are equidistant from the first center point. There is a second distance $G_2$ between the first center point and each of the first inner sides, and second distance $G_2$ satisfies a following relation:

[Formula 1]

$$G_2 = \left[2df(n_e - n_o)\frac{a-1}{a}\right]^{\frac{1}{2}}, \quad (1)$$

where d denotes a maximum thickness of the liquid crystal layer, f denotes a focus of the liquid crystal lenticular lens, $n_e$ denotes the extraordinary refractive index of the liquid crystal layer, $n_o$ denotes the ordinary refractive index of the liquid crystal layer, a denotes a number of equal parts of a whole difference between the extraordinary refractive index of the liquid crystal layer and the ordinary refractive index of the liquid crystal layer, and the number of the equal parts is greater than or equal to 3. The second electrodes are disposed between the first electrodes. Each of the second electrodes has a second inner side and a second outer side disposed opposite to the second inner side. The second inner sides face each other. There is a fourth distance between the second inner sides, and the fourth distance equals one-fourth of the first distance. There is a fifth distance $G_5$ between the first center point and each of the second outer sides, and the fifth distance $G_5$ satisfies a following relation:

[Formula 2]

$$G_5 = \left[2df(n_e - n_o)\frac{1}{a}\right]^{\frac{1}{2}}. \quad (2)$$

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, features of the embodiments will be made in detail. The embodiments of the present invention are illustrated in the accompanying drawings with numbered elements. In addition, the terms such as "first" and "second" described in the present invention are used to distinguish different components or processes, which do not limit the sequence of the components or processes.

Figure 1:
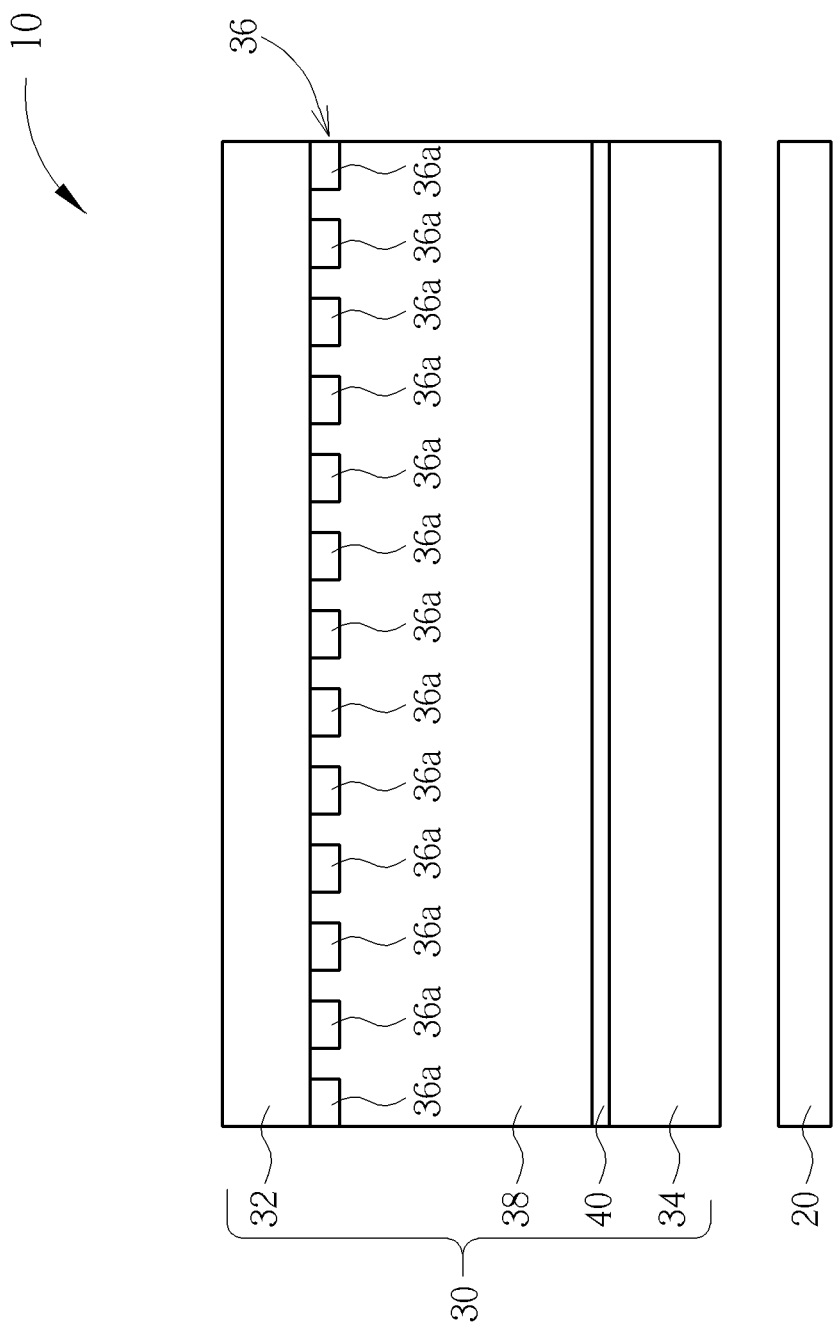
FIG. 1 is a schematic diagram illustrating a conventional liquid crystal lenticular lens stereoscopic display device.
Figure 2:
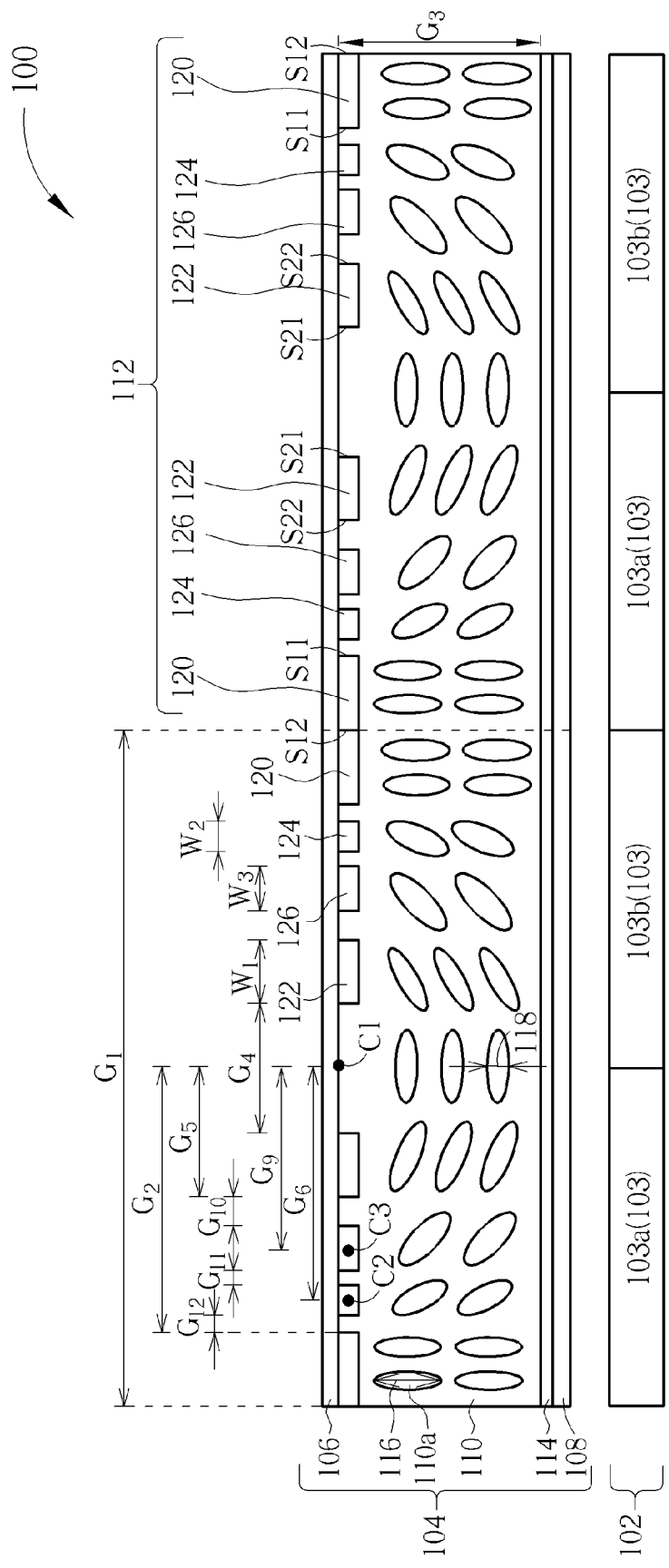
FIG. 2 is a schematic diagram illustrating a two-dimensional and three-dimensional stereoscopic switchable display device according to a first embodiment of the present invention.

Please refer to FIG. 2. FIG. 2 is a schematic diagram illustrating a two-dimensional and three-dimensional stereoscopic switchable display device according to a first embodiment of the present invention. As shown in FIG. 2, the two-dimensional and three-dimensional stereoscopic switchable display device 100 in this embodiment includes a display panel 102 and a liquid crystal lenticular lens 104. The display panel 102 and the liquid crystal lenticular lens 104 are disposed on the display panel 102. The display panel 102 in this embodiment may include a liquid crystal display (LCD) panel, an organic electroluminescent display panel, a plasma display panel, an electro-phoretic display panel, a field emission display (FED) panel or other kinds of suitable display panels. The display panel 102 includes a plurality of sub-pixel regions 103. The liquid crystal lenticular lens 104 includes a first substrate 106, a second substrate 108, a liquid crystal layer 110, a plurality of electrode units 112 and a common electrode 114. The first substrate 106 and the second substrate 108 are disposed opposite to each other. The second substrate 108 is disposed between the display panel 102 and the first substrate 106. The liquid crystal layer 110 is disposed between the first substrate 106 and the second substrate 108. The liquid crystal layer 110 has an ordinary refractive index and an extraordinary refractive index. The liquid crystal layer 110 includes a plurality of liquid crystal molecules 110a. Each of the liquid crystal molecules 110a has a long axis 116 and a short axis 118. When light propagates along the long axis 116 of the liquid crystal molecules 110a, the light will experience the ordinary refractive index of the liquid crystal molecules 110a. On the other hand, when light propagates along the short axis 118 of the liquid crystal molecules 110a, the light will experience the extraordinary refractive index of the liquid crystal molecules 110a. The electrode units 112 are disposed on the first substrate 106 and beneath the liquid crystal layer 110. The common electrode 114 is disposed between the second substrate 108 and the liquid crystal layer 110 and disposed on the second substrate 108. Under a three-dimensional stereoscopic display mode, the electric field between the common electrode 114 and each of the electrode units 112 causes the liquid crystal molecules 110a to rotate and orient themselves along the direction of the field, and thus a liquid crystal lens is formed in the liquid crystal layer 110 corresponding to each of the electrode units 112. In addition, each of the electrode units 112 is disposed correspondingly to two of the sub-pixel regions 103 adjacent to each other so that the sub-pixel regions 103 can be divided into a left eye sub-pixel 103a and a right eye sub-pixel 103b. The liquid crystal lenticular lens 104, moreover, can be employed to alter the directions of light rays emitted from the left eye sub-pixels 103a and the right eye sub-pixels 103b adjacent to the left eye sub-pixels 103a so as to display a three-dimensional stereoscopic image.

Figure 3:
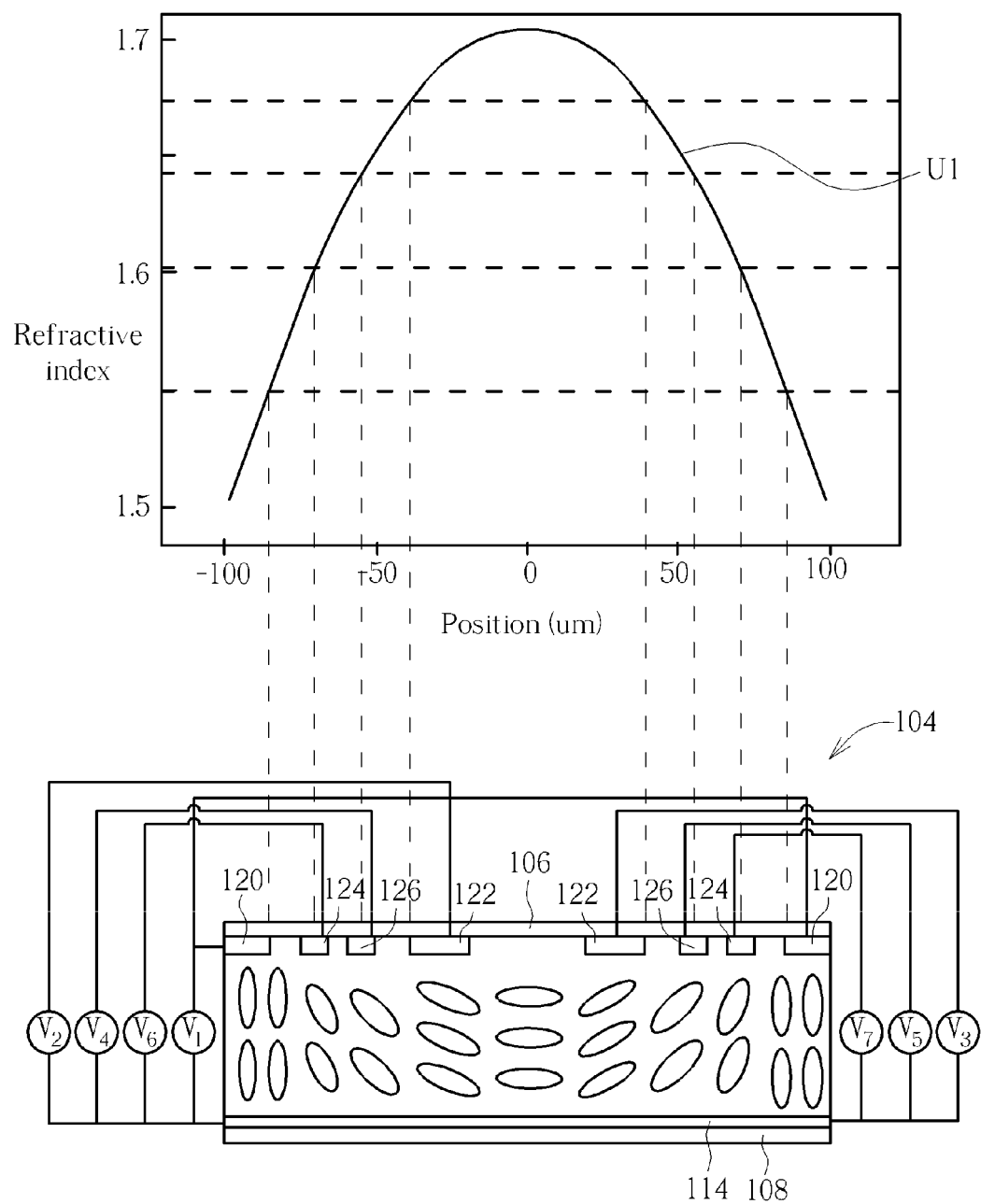
FIG. 3 is a schematic diagram of the refractive index of an ideal lens versus the position in an electrode unit according to the first embodiment of the present invention.

To provide a better understanding of the structure of the liquid crystal lenticular lens, the following illustration and descriptions will only focus on a single electrode unit, but not limited thereto. Please refer to FIG. 3 and also refer to FIG. 2. FIG. 3 is a schematic diagram of the refractive index of an ideal lens versus the position in an electrode unit according to the first embodiment of the present invention. As shown in FIGS. 2-3, the first curve U1 presents significant information about a relation between the refractive index of an ideal lens and the position in an electrode unit. In this embodiment, the number of equal parts of the whole difference between the extraordinary refractive index of the liquid crystal layer and the ordinary refractive index of the liquid crystal layer equals 5. The quantity of each equal part is the same as that of the others. Each of the electrode units 112, in this embodiment, includes two first electrodes 120, two second electrodes 122, two third electrodes 124 and two fourth electrodes 126. The first electrodes 120 are electrically connected to the first voltage source V1. The second electrodes 122 are respectively electrically connected to the second voltage source V2 and the third voltage source V3. The third electrodes 124 are respectively electrically connected to the sixth voltage source V6 and the seventh voltage source V7. The fourth electrodes 126 are respectively electrically connected to the fourth voltage source V4 and the fifth voltage source V5. In each of the electrode units 112, each of the first electrodes 120 has a first inner side S11 and a first outer side S12 disposed opposite to the first inner side S11. The first inner sides S11 of the first electrodes 120 face each other. There is a first distance $G_1$ between the first outer sides S12 of the first electrodes 120, and the first distance $G_1$ is the unit width of the liquid crystal lenticular lens 104. For example, if the width of the display panel 102 is 15.6 inch, the unit width of the liquid crystal lenticular lens 104 may be 257 micrometers, but not limited thereto. There is a first center point C1 between the first outer sides S12 of the first electrodes 120, and the first center point C1 is equidistant from each of the first outer sides S12. In other words, the first electrodes 120 are symmetric with respect to the first center point C1. The second electrodes 122, the third electrodes 124 and the fourth electrodes 126 are respectively symmetric with respect to the first center point C1. Moreover, there is a second distance $G_2$ between the first center point C1 and each of the first inner sides S11. The second distance $G_2$ satisfies the following relation:

[Formula 1]

$$G_2 = \left[2df(n_e - n_o)\frac{a-1}{a}\right]^{\frac{1}{2}}, \quad (1)$$

where d denotes the maximum thickness of the liquid crystal layer 110. For example, the third distance $G_3$ between the common electrode 114 and the first substrate 106 is the cell gap of the liquid crystal layer 110 of the liquid crystal lenticular lens 104. f denotes a focal length of the liquid crystal lenticular lens 104. $n_e$ denotes the extraordinary refractive index of the liquid crystal layer 110. $n_o$ denotes the ordinary refractive index of the liquid crystal layer 110. a denotes the number of the equal parts of the whole difference between the extraordinary refractive index of the liquid crystal layer 110 and the ordinary refractive index of the liquid crystal layer 110. The quantity of each equal part is the same as that of the others. In this embodiment, the number of the equal parts equals 5. Therefore, the second distance $G_2$ of this embodiment is $$\left[\frac{8}{5}df(n_e - n_0)\right]^{\frac{1}{2}}.$$

The number of the equal parts in the present invention is not limited to this, and may be greater than or equal to 3. Because the first distance $G_1$ between the first outer sides S12 of the first electrodes 120 is the unit width of the liquid crystal lenticular lens 104, the exact location of each of the first electrodes 120 in the liquid crystal lenticular lens 104 can be determined. Moreover, the distance between the first inner side S11 and the first outer side S12 of each of the first electrodes 120, which is the width of each of the first electrodes 120, can be determined with the second distance $G_2$. The width of each of the first electrodes 120 may be, for example, in a range between 13 micrometers and 15 micrometers. In the liquid crystal lenticular lens 104 of this embodiment, one of the first electrodes 120 of each of the electrode units 112 and one of the first electrodes 120 of another one of the electrode units 112 adjacent to each other are in contact with each other. In other words, any two of the first electrodes 120 adjacent to each other in any two of the electrode units 112 adjacent to each other respectively is in contact with each other, and there is no gap between the adjacent electrode units 112. In this way, the same voltage can be applied to the first electrodes 120. In this embodiment, the first curve U1, which presents the relation between the refractive index and the position in one electrode unit, satisfies the following relation:

[Formula 5]

$$n(r) = n_e - \frac{r^2}{2df}, \quad (5)$$

where r denotes the distance between the position and the first center point C1. For example, the third distance $G_3$ between the common electrode 114 and the first substrate 106 may be 30.5 micrometers. The focal length of the liquid crystal lenticular lens 104 may be 1344.3 micrometers. The extraordinary refractive index of the liquid crystal layer 110 may be 1.712. The ordinary refractive index of the liquid crystal layer 110 may be 1.511. However, the present invention is not limited to this.

In each of the electrode units 112, both the second electrodes 122 are disposed between the two first electrodes 120, and each of the second electrodes 122 has the first width W1. Each of the second electrodes 122 has a second inner side S21 and a second outer side S22. The second inner side S21 and the second outer side S22 are disposed opposite to each other. The second inner sides S21 face each other. There is a fourth distance $G_4$ between the second inner sides S21, and the fourth distance $G_4$ equals one-fourth of the first distance $G_1$. In other words, the fourth distance $G_4$ between the second inner sides S21 of the second electrodes 122 is designed as one-fourth of the unit width of the liquid crystal lenticular lens 104. For example, if the unit width of the liquid crystal lenticular lens 104 is 257 micrometers, the fourth distance $G_4$ may be in a range between 64 micrometers and 65 micrometers, but not limited thereto. Because the second electrodes 122 are symmetric with respect to the first center point C1, the exact location of each of the second electrodes 122 in the liquid crystal lenticular lens 104 can be determined. Moreover, there is a fifth distance $G_5$ between the first center point C1 and each of the second outer sides S22, and the fifth distance $G_5$ satisfies the following relation:

[Formula 2]

$$G_5 = \left[2df(n_e - n_o)\frac{1}{a}\right]^{\frac{1}{2}}. \quad (2)$$

In this embodiment, because the number of the equal parts equals 5, the fifth distance $G_5$ of this embodiment is $$\left[\frac{2}{5}df(n_e - n_0)\right]^{\frac{1}{2}}.$$

Accordingly, the first width W1 of the second electrodes 122 can be determined with both the fourth distance $G_4$ and the fifth distance $G_5$. The first width W1, for example, is in a range between 20 micrometers and 25 micrometers.

In each of the electrode units 112, each of the third electrodes 124 is respectively disposed between each of the first electrodes 120 and each of the second electrodes 122 adjacent to each other. Each of the third electrodes 124 has a second center point C2. Moreover, there is a sixth distance $G_6$ between the first center point C1 and each of the second center points C2, and the sixth distance $G_6$ satisfies the following relation:

[Formula 3]

$$G_6 = \left[2df(n_e - n_o)\frac{a-2}{a}\right]^{\frac{1}{2}}. \quad (3)$$

In this embodiment, because the number of the equal parts equals 5, the sixth distance $G_6$ of this embodiment is $$\left[\frac{6}{5}df(n_e - n_0)\right]^{\frac{1}{2}}.$$

Accordingly, the exact location of each of the third electrodes 124 in the liquid crystal lenticular lens 104 can be determined.

In addition, in each of the electrode units 112, each of the fourth electrodes 126 is respectively disposed between each of the third electrodes 124 and each of the second electrodes 122 adjacent to each other. Each of the fourth electrodes 126 has a third center point C3. Moreover, there is a ninth distance $G_9$ between the first center point C1 and each of the third center points C3, and the ninth distance $G_9$ satisfies the following relation:

[Formula 4]

$$G_9 = \left[2df(n_e - n_o)\frac{a-3}{a}\right]^{\frac{1}{2}}. \quad (4)$$

In this embodiment, because the number of the equal parts equals 5, the ninth distance $G_9$ of this embodiment is $$\left[\frac{4}{5}df(n_e - n_0)\right]^{\frac{1}{2}}.$$

Accordingly, the exact location of each of the fourth electrodes 126 in the liquid crystal lenticular lens 104 can be determined.

In this embodiment, each of the third electrodes 124 has a second width W2. Each of the fourth electrodes 126 has a third width W3. Each of the first widths W1, each of the second widths W2 and each of the third widths W3 are in the ratio of 5:3:2. For example, the second width W2 is in a range between 12 micrometers and 15 micrometers, and the third width W3 is in a range between 8 micrometers and 10 micrometers, but not limited thereto. Furthermore, there is a tenth distance $G_{10}$ between each of the second electrodes 122 and each of the fourth electrodes 126 adjacent to each other. There is an eleventh distance $G_{11}$ between each of the fourth electrodes 126 and each of the third electrodes 124 adjacent to each other. There is a twelfth distance $G_{12}$ between each of the third electrodes 124 and each of the first electrodes 120 adjacent to each other. Each of the tenth distances $G_{10}$, each of the eleventh distances $G_{11}$ and each of the twelfth distances $G_{12}$ in the ratio of 2:1:1. For example, the tenth distance $G_{10}$ is in a range between 19 micrometers and 21 micrometers, the eleventh distance $G_{11}$ is in a range between 8 micrometers and 12 micrometers, and the twelfth distance $G_{12}$ is in a range between 8 micrometers and 12 micrometers, but not limited thereto.

Figure 4:
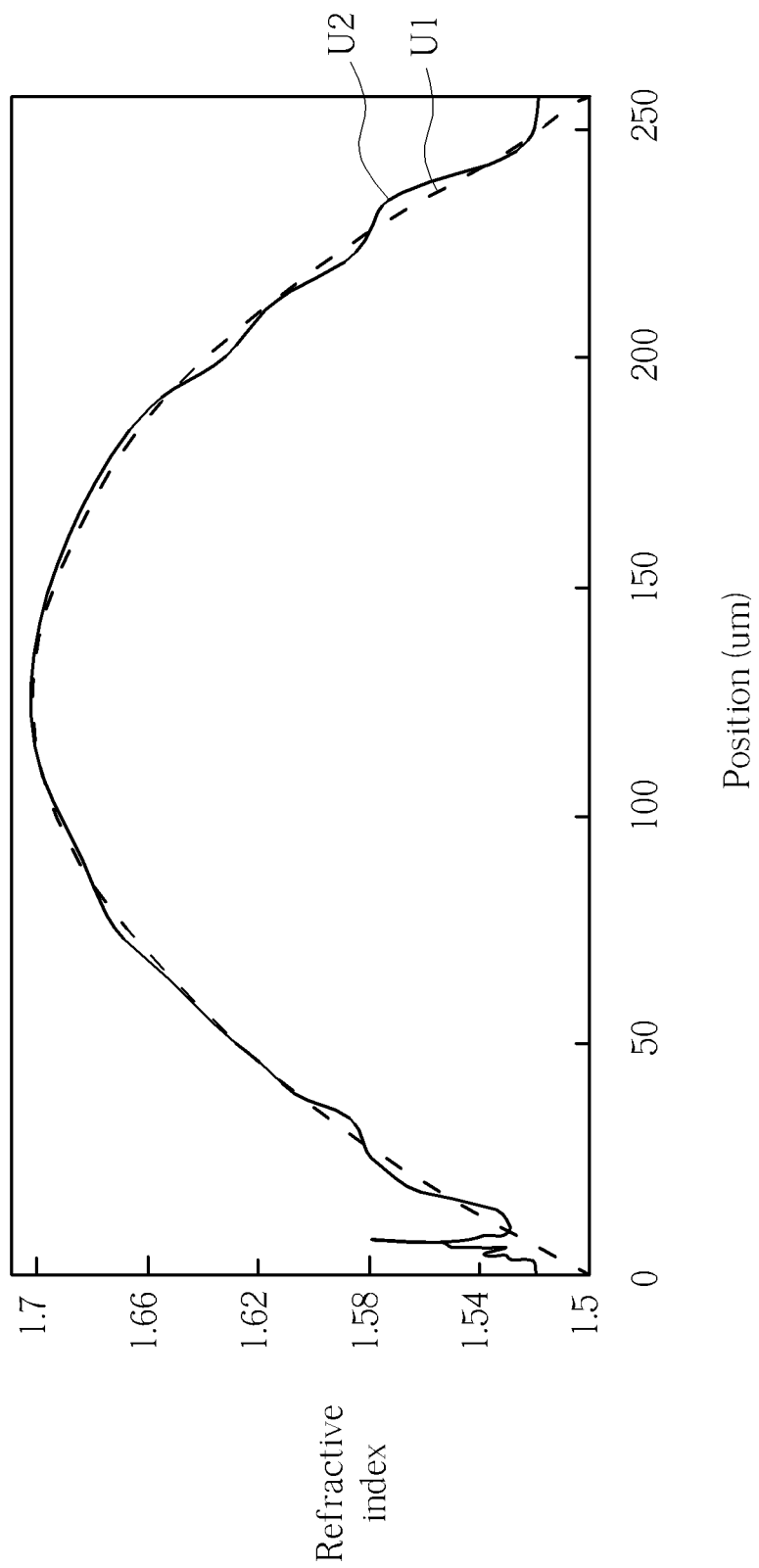
FIG. 4 is a schematic diagram of the refractive index versus the position in the liquid crystal lenticular lens according to the first embodiment of the present invention.
Figure 5:
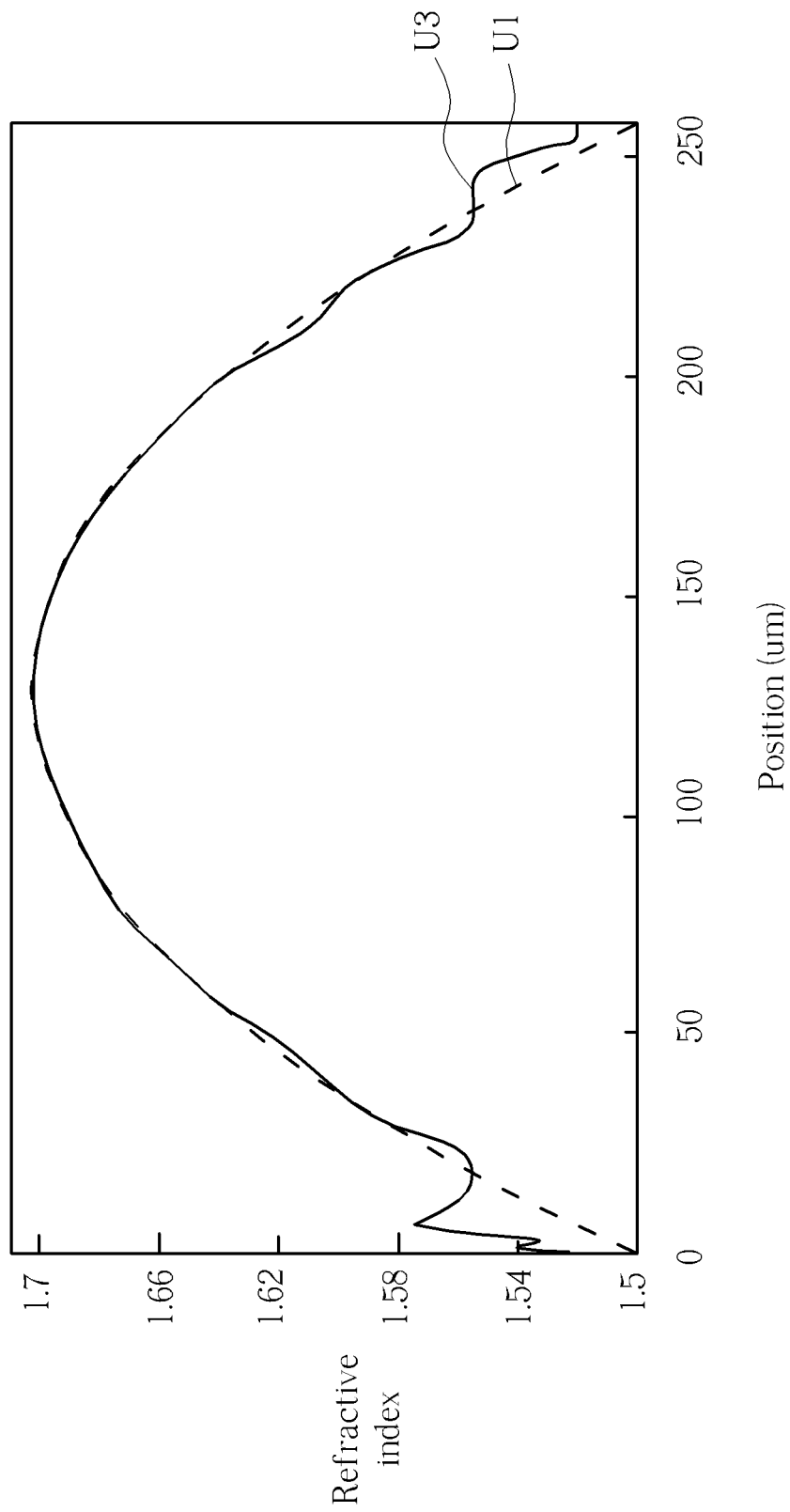
FIG. 5 is a schematic diagram of the refractive index versus the position in a liquid crystal lenticular lens of a conventional approach with thirteen electrodes.
Figure 6:
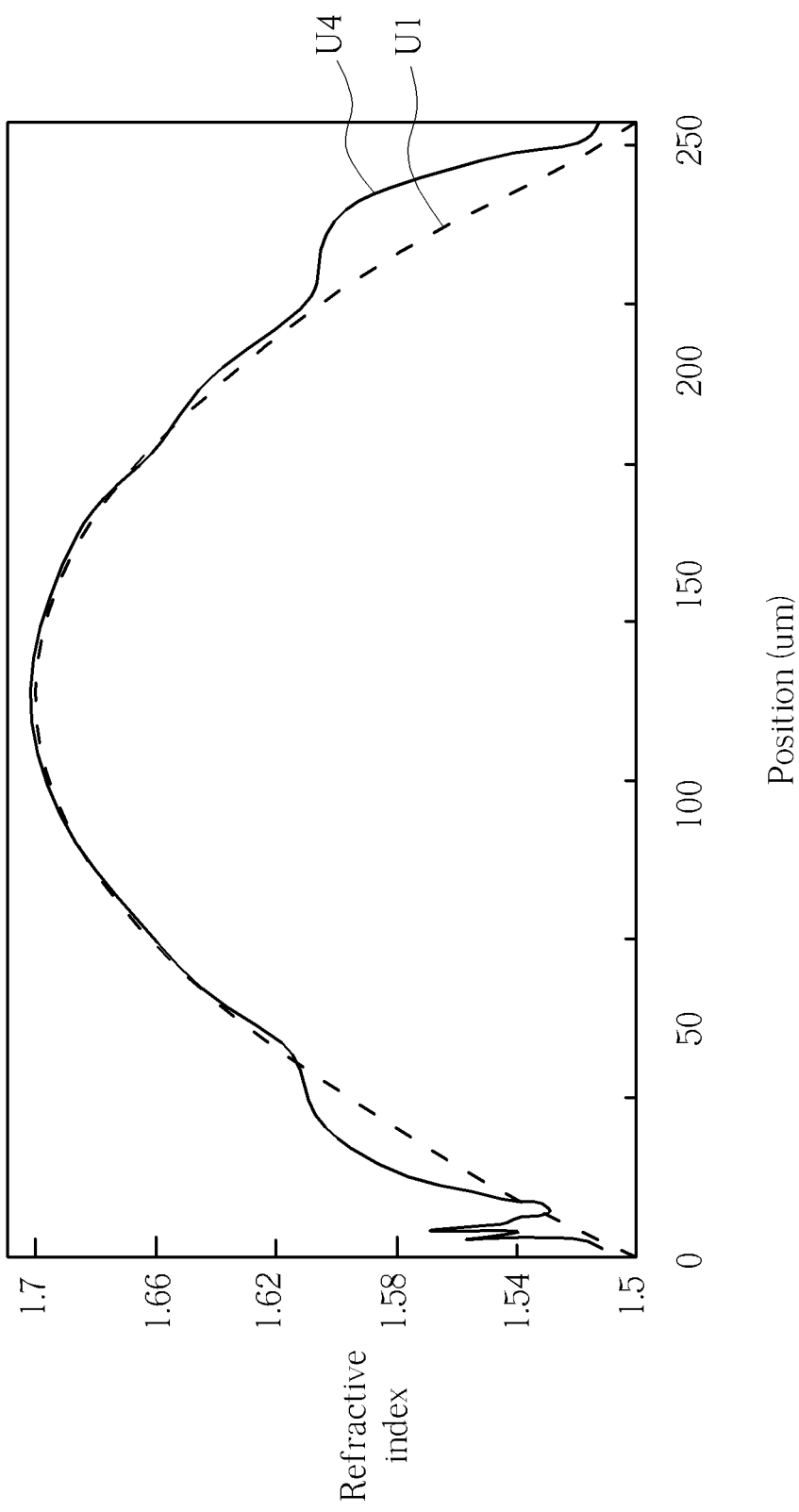
FIG. 6 is a schematic diagram of the refractive index versus the position in a liquid crystal lenticular lens of a conventional approach with seven electrodes.

Please refer to FIGS. 4-6. FIG. 4 is a schematic diagram of the refractive index versus the position in the liquid crystal lenticular lens according to the first embodiment of the present invention. In FIG. 4, the first curve U1 presents the relation between the refractive index of an ideal lens and the position in an electrode unit. The second curve U2 presents the relation between the refractive index of the liquid crystal lenticular lens in this embodiment and the position in the electrode unit. FIG. 5 is a schematic diagram of the refractive index versus the position in a liquid crystal lenticular lens of a conventional approach with thirteen electrodes. In FIG. 5, the third curve U3 presents the relation between the refractive index of the liquid crystal lenticular lens and the position in the conventional approach with thirteen electrodes. FIG. 6 is a schematic diagram of the refractive index versus the position in a liquid crystal lenticular lens of a conventional approach with seven electrodes. In FIG. 6, the fourth curve U4 presents the relation between the refractive index of the liquid crystal lenticular lens and the position in the conventional approach with seven electrodes. As shown in FIGS. 4-6, the lens effect of the liquid crystal lenticular lens of this embodiment is an acceptable approximation of the lens effect of an ideal lens, and therefore the liquid crystal lenticular lens of this embodiment can offer a vivid three-dimensional stereoscopic image effectively. Compared with the liquid crystal lenticular lens in the conventional approach with thirteen electrodes, which requires thirteen power sources, the liquid crystal lenticular lens in this embodiment only requires seven power sources to match the lens effect of the liquid crystal lenticular lens in the conventional approach with thirteen electrodes. Accordingly, the liquid crystal lenticular lens in this embodiment can effectively lighten the loads of a power source, decrease the amount of electrodes in each of the electrode units, and broaden design possibilities. Moreover, compared with the liquid crystal lenticular lens in the conventional approach with seven electrodes, which requires seven power sources, the liquid crystal lenticular lens in this embodiment requires the same amount of power sources but more accurately match the lens effect similar to that of an ideal lens.

Figure 7:
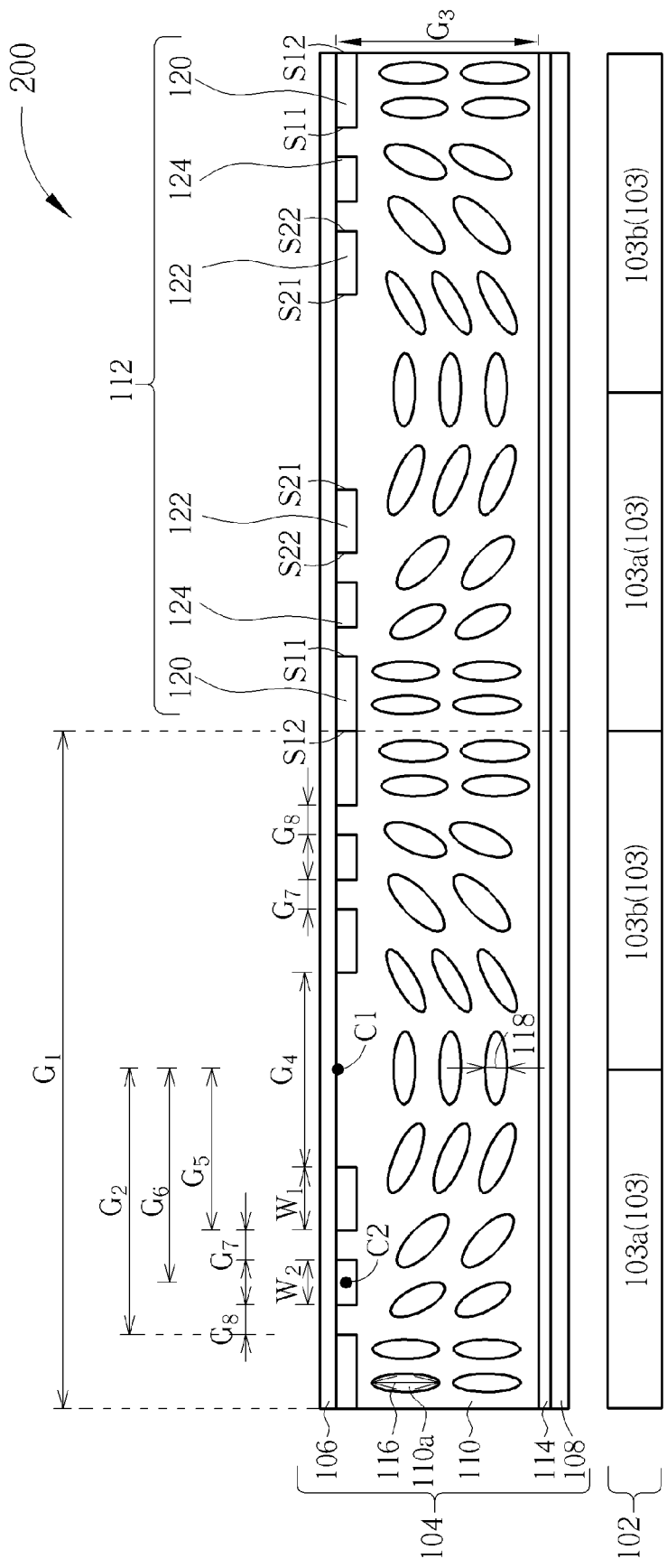
FIG. 7 is a schematic diagram illustrating a liquid crystal lenticular lens according to a second embodiment of the present invention.
Figure 8:
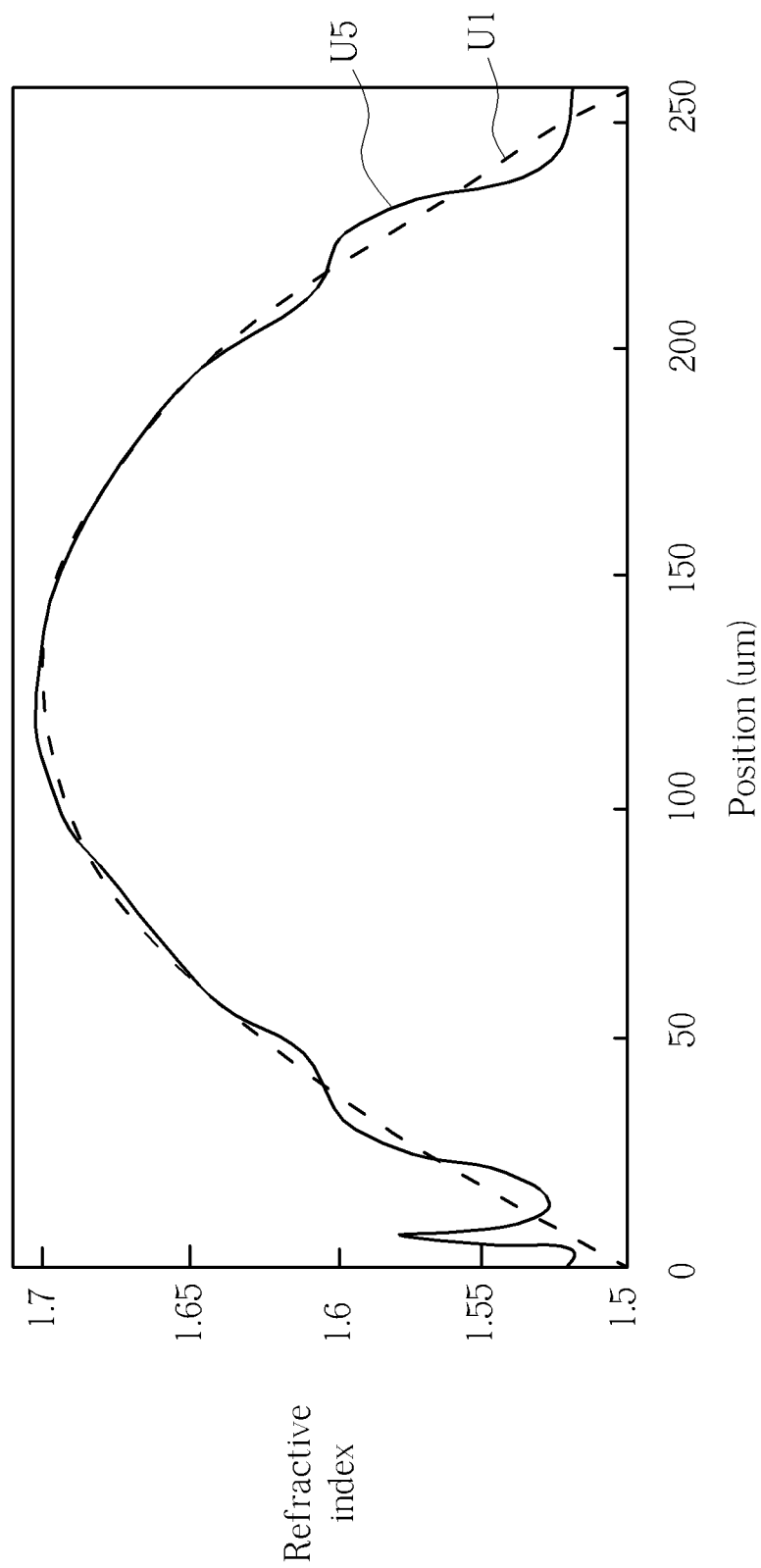
FIG. 8 is a schematic diagram of the refractive index versus the position in the liquid crystal lenticular lens according to the second embodiment of the present invention.

Please refer to FIGS. 7-8. FIG. 7 is a schematic diagram illustrating a liquid crystal lenticular lens according to a second embodiment of the present invention. FIG. 8 is a schematic diagram of the refractive index versus the position in the liquid crystal lenticular lens according to the second embodiment of the present invention. In order to simplify and show the differences or modifications between the following embodiments and the above-mentioned embodiment, the same numerals denote the same components in the following description, and the similar parts are not detailed redundantly. As shown in FIG. 7, the difference between the first embodiment and this embodiment is that the number of the equal parts of the whole difference between the extraordinary refractive index of the liquid crystal layer and the ordinary refractive index of the liquid crystal layer equals 4. In addition, each of the electrode units 112 only includes the first electrodes 120, the second electrodes 122 and the third electrodes 124 and excludes the fourth electrodes. Therefore, the liquid crystal lenticular lens 200 only requires the first voltage source V1 applied to the first electrodes 120, the second voltage source V2 applied to one of the second electrodes 122, the third voltage source V3 applied to the other of the second electrodes 122, the fourth voltage source V4 applied to one of the third electrodes 124 and the fifth voltage source V5 applied to the other of the third electrodes 124. Accordingly, the second distance $G_2$ becomes $$\left[\frac{6}{4}df(n_e - n_0)\right]^{\frac{1}{2}}.$$

The fifth distance $G_5$ becomes $$\left[\frac{2}{4}df(n_e - n_0)\right]^{\frac{1}{2}}.$$

The sixth distance $G_6$ becomes $$[df(n_e - n_0)]^{\frac{1}{2}}.$$

In this embodiment, the ratio of each of the first widths W1 to each of the second widths W2 is 2:1. There is a seventh distance $G_7$ between each of the second electrodes 122 and each of the third electrodes 124 adjacent to each other. There is an eighth distance $G_8$ between each of the third electrodes 124 and each of the first electrodes 120 adjacent to each other. The ratio of each of the seventh distances $G_7$ to each of the eighth distances $G_8$ is 1:1. As shown in FIG. 8, the first curve U1 presents the relation between the refractive index of an ideal lens and the position in an electrode unit. The fifth curve U5 presents the relation between the refractive index of the liquid crystal lenticular lens in the second embodiment and the position in the electrode unit. Moreover, the liquid crystal lenticular lens in this embodiment only requires five power sources to achieve the lens effect similar to that of an ideal lens, and therefore the liquid crystal lenticular lens of this embodiment can offer a vivid three-dimensional stereoscopic image effectively.

Figure 9:
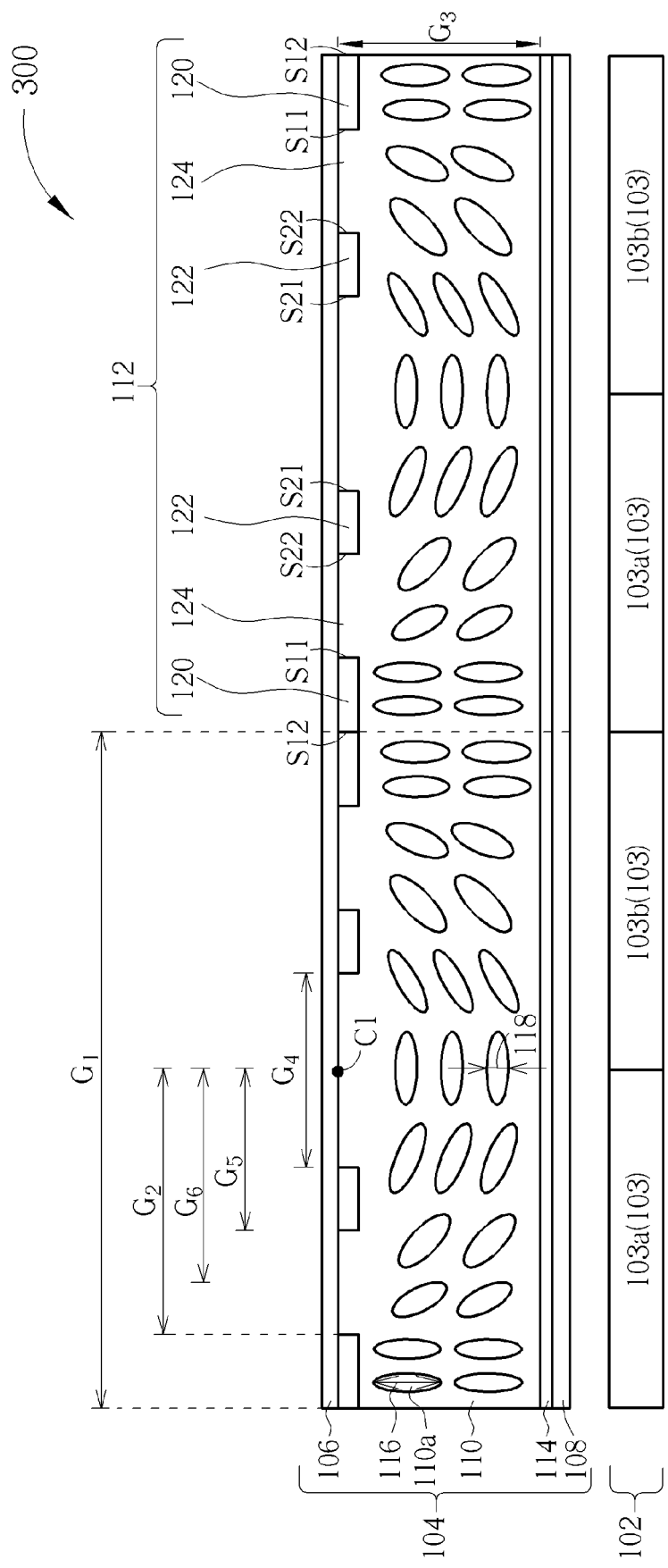
FIG. 9 is a schematic diagram illustrating a liquid crystal lenticular lens according to a third embodiment of the present invention.
Figure 10:
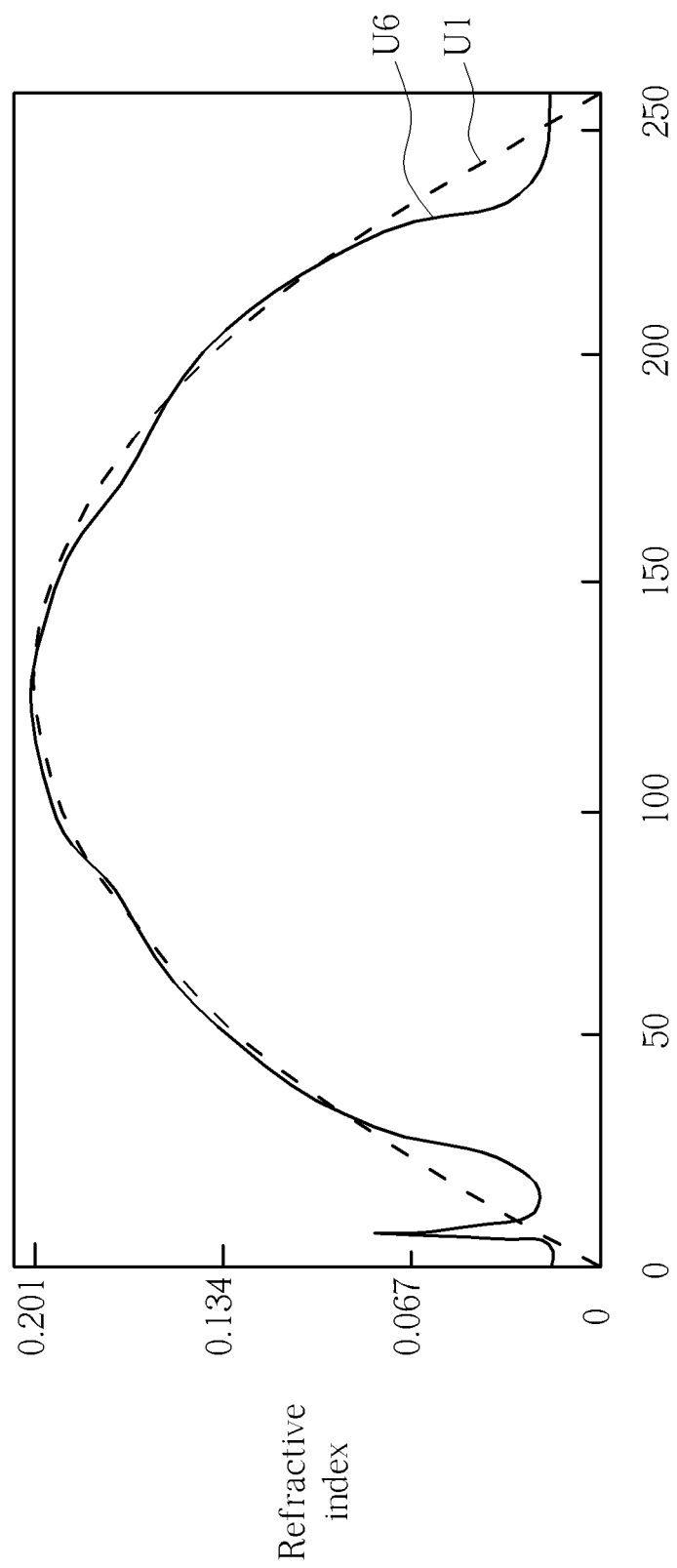
FIG. 10 is a schematic diagram of the refractive index versus the position in the liquid crystal lenticular lens according to the third embodiment of the present invention.

Please refer to FIGS. 9-10. FIG. 9 is a schematic diagram illustrating a liquid crystal lenticular lens according to a third embodiment of the present invention. FIG. 10 is a schematic diagram of the refractive index versus the position in the liquid crystal lenticular lens according to the third embodiment of the present invention. In order to simplify and show the differences or modifications between the following embodiments and the above-mentioned embodiment, the same numerals denote the same components in the following description, and the similar parts are not detailed redundantly. As shown in FIG. 9, the difference between the first embodiment and this embodiment is that the number of the equal parts of the whole difference between the extraordinary refractive index of the liquid crystal layer and the ordinary refractive index of the liquid crystal layer equals 3. In addition, each of the electrode units 112 only includes the first electrodes 120 and the second electrodes 122 and excludes the fourth electrodes and the third electrodes. Therefore, the liquid crystal lenticular lens 300 only requires the first voltage source V1 applied to the first electrodes 120, the second voltage source V2 applied to one of the second electrodes 122 and the third voltage source V3 applied to the other of the second electrodes 122. Accordingly, the second distance $G_2$ becomes $$\left[\frac{4}{3}df(n_e - n_0)\right]^{\frac{1}{2}}.$$

The fifth distance $G_5$ becomes $$\left[\frac{2}{3}df(n_e - n_0)\right]^{\frac{1}{2}}.$$

As shown in FIG. 10, the first curve U1 presents the relation between the refractive index of an ideal lens and the position in an electrode unit. The sixth curve U6 presents the relation between the refractive index of the liquid crystal lenticular lens in the third embodiment and the position in the electrode unit. Moreover, the liquid crystal lenticular lens in this embodiment only requires three power sources to achieve the lens effect similar to that of an ideal lens, and therefore the liquid crystal lenticular lens of this embodiment can offer a vivid three-dimensional stereoscopic image effectively.

In other variant embodiments of the present invention, the number of the equal parts of the whole difference between the extraordinary refractive index of the liquid crystal layer and the ordinary refractive index of the liquid crystal layer may be greater than 5. In this case, crystal lenticular lens may require more than seven power sources. Moreover, the quantity of electrodes in each of the electrode units may be greater than four pairs.

To sum up, in the liquid crystal lenticular lenses of the present invention, the refractive index of an ideal lens is divided into a plurality of equal parts. Electrodes with different widths and different pitches are disposed according to the equal parts so as to achieve the lens effect similar to that of an ideal lens. In this way, the loads of a power source can be effectively lightened, the amount of electrodes in each of the electrode units decreases, and design possibilities are broadened.

Those skilled in the art will readily observe that numerous modifications and alterations of the device and method may be made while retaining the teachings of the invention. Accordingly, the above invention should be construed as limited only by the metes and bounds of the appended claims.

What is claimed is:

1. A liquid crystal lenticular lens, comprising:
a first substrate;
a second substrate, disposed opposite to the first substrate;
a liquid crystal layer, disposed between the first substrate and the second substrate, wherein the liquid crystal layer has an ordinary refractive index and an extraordinary refractive index;
a common electrode, disposed between the second substrate and the liquid crystal layer;
two first electrodes, disposed between the first substrate and the liquid crystal layer, wherein each of the first electrodes has a first inner side and a first outer side disposed opposite to the first inner side, the first inner sides face each other, there is a first distance between the first outer sides, there is a first center point between the first outer sides equidistant from the first center point, there is a second distance $G_2$ between the first center point and each of the first inner sides, and the second distance $G_2$ satisfies a following relation:

[Formula 1]

$$G_2 = \left[2df(n_e - n_o)\frac{a-1}{a}\right]^{\frac{1}{2}}, \quad (1)$$

where d denotes a maximum thickness of the liquid crystal layer, f denotes a focal length of the liquid crystal lenticular lens, $n_e$ denotes the extraordinary refractive index of the liquid crystal layer, $n_o$ denotes the ordinary refractive index of the liquid crystal layer, a denotes a number of equal parts of a whole difference between the extraordinary refractive index of the liquid crystal layer and the ordinary refractive index of the liquid crystal layer, and the number of the equal parts is greater than or equal to 3; and
two second electrodes, disposed between the first substrate and the liquid crystal layer and between the first electrodes, wherein each of the second electrodes has a second inner side and a second outer side disposed opposite to the second inner side, the second inner sides face each other, there is a fourth distance between the second inner sides, the fourth distance equals one-fourth of the first distance, there is a fifth distance $G_5$ between the first center point and each of the second outer sides, and the fifth distance $G_5$ satisfies a following relation:

[Formula 2]

$$G_5 = \left[2df(n_e - n_o)\frac{1}{a}\right]^{\frac{1}{2}}. \quad (2)$$

2. The liquid crystal lenticular lens according to claim 1, further comprising two third electrodes disposed between the first substrate and the liquid crystal layer, wherein each of the third electrodes is respectively disposed between each of the first electrodes and each of the second electrodes adjacent to each other, each of the third electrodes has a second center point, there is a sixth distance $G_6$ between the first center point and each of the second center points, and the sixth distance $G_6$ satisfies a following relation:

[Formula 3]

$$G_6 = \left[2df(n_e - n_o)\frac{a-2}{a}\right]^{\frac{1}{2}}. \quad (3)$$

3. The liquid crystal lenticular lens according to claim 2, wherein each of the second electrodes has a first width when the number of the equal parts equals 4, each of the third electrodes has a second width when the number of the equal parts equals 4, and a ratio of each of the first widths to each of the second widths is 2:1 when the number of the equal parts equals 4.

4. The liquid crystal lenticular lens according to claim 3, wherein there is a seventh distance between each of the second electrodes and each of the third electrodes adjacent to each other, there is an eighth distance between each of the third electrodes and each of the first electrodes adjacent to each other, and a ratio of each of the seventh distances to each of the eighth distances is 1:1.

5. The liquid crystal lenticular lens according to claim 2, further comprising two fourth electrodes disposed between the first substrate and the liquid crystal layer, wherein each of the fourth electrodes is respectively disposed between each of the third electrodes and each of the second electrodes adjacent to each other, each of the fourth electrodes has a third center point, there is a ninth distance $G_9$ between the first center point and each of the third center points, and the ninth distance $G_9$ satisfies a following relation:

[Formula 4]

$$G_9 = \left[2df(n_e - n_o)\frac{a-3}{a}\right]^{\frac{1}{2}}. \quad (4)$$

6. The liquid crystal lenticular lens according to claim 5, wherein each of the second electrodes has a first width when the number of the equal parts equals 5, each of the third electrodes has a second width when the number of the equal parts equals 5, each of the fourth electrodes has a third width when the number of the equal parts equals 5, and each of the first widths, each of the second widths and each of the third widths in a ratio of 5:3:2 when the number of the equal parts equals 5.

7. The liquid crystal lenticular lens according to claim 6, wherein there is a tenth distance between each of the second electrodes and each of the fourth electrodes adjacent to each other, there is an eleventh distance between each of the fourth electrodes and each of the third electrodes adjacent to each other, there is a twelfth distance between each of the third electrodes and each of the first electrodes adjacent to each other, each of the tenth distances, each of the eleventh distances and each of the twelfth distances in a ratio of 2:1:1.

8. A two-dimensional and three-dimensional stereoscopic switchable display device, comprising:
a display panel; and
a liquid crystal lenticular lens, disposed on display panel, comprising:
  a first substrate;
  a second substrate, disposed opposite to the first substrate;
  a liquid crystal layer, disposed between the first substrate and the second substrate, wherein the liquid crystal layer has an ordinary refractive index and an extraordinary refractive index;
  a common electrode, disposed between the second substrate and the liquid crystal layer; and
  a plurality of electrode units, disposed between the first substrate and the liquid crystal layer, wherein each of the electrode units comprises:
    two first electrodes, wherein each of the first electrodes has a first inner side and a first outer side disposed opposite to the first inner side, the first inner sides face each other, there is a first distance between the first outer sides, there is a first center point between the first outer sides equidistant from the first center point, there is a second distance $G_2$ between the first center point and each of the first inner sides, and the second distance $G_2$ satisfies a following relation:

[Formula 1]

$$G_2 = \left[2df(n_e - n_o)\frac{a-1}{a}\right]^{\frac{1}{2}}, \quad (1)$$

where d denotes a maximum thickness of the liquid crystal layer, f denotes a focal length of the liquid crystal lenticular lens, $n_e$ denotes the extraordinary refractive index of the liquid crystal layer, $n_o$ denotes the ordinary refractive index of the liquid crystal layer, a denotes a number of equal parts of a whole difference between the extraordinary refractive index of the liquid crystal layer and the ordinary refractive index of the liquid crystal layer, and the number of the equal parts is greater than or equal to 3; and
    two second electrodes, disposed between the first electrodes, wherein each of the second electrodes has a second inner side and a second outer side disposed opposite to the second inner side, the second inner sides face each other, there is a fourth distance between the second inner sides, the fourth distance equals one-fourth of the first distance, there is a fifth distance $G_5$ between the first center point and each of the second outer sides, and the fifth distance $G_5$ satisfies a following relation:

[Formula 2]

$$G_5 = \left[2df(n_e - n_o)\frac{1}{a}\right]^{\frac{1}{2}}. \quad (2)$$

9. The two-dimensional and three-dimensional stereoscopic switchable display device according to claim 8, wherein one of the first electrodes of each of the electrode units and one of the first electrodes of another one of the electrode units adjacent to each other are in contact with each other.

10. The two-dimensional and three-dimensional stereoscopic switchable display device according to claim 8, wherein each of the electrode units further comprises two third electrodes, each of the third electrodes is respectively disposed between each of the first electrodes and each of the second electrodes adjacent to each other, each of the third electrodes has a second center point, there is a sixth distance $G_6$ between the first center point and each of the second center points, and the sixth distance $G_6$ satisfies a following relation:

[Formula 3]

$$G_6 = \left[2df(n_e - n_o)\frac{a-2}{a}\right]^{\frac{1}{2}}. \quad (3)$$

11. The two-dimensional and three-dimensional stereoscopic switchable display device according to claim 10, wherein each of the second electrodes has a first width when the number of the equal parts equals 4, each of the third electrodes has a second width when the number of the equal parts equals 4, and a ratio of each of the first widths to each of the second widths is 2:1 when the number of the equal parts equals 4.

12. The two-dimensional and three-dimensional stereoscopic switchable display device according to claim 11, wherein there is a seventh distance between each of the second electrodes and each of the third electrodes adjacent to each other, there is an eighth distance between each of the third electrodes and each of the first electrodes adjacent to each other, and a ratio of each of the seventh distances to each of the eighth distances is 1:1.

13. The two-dimensional and three-dimensional stereoscopic switchable display device according to claim 10, wherein each of the electrode units further comprises two fourth electrodes, wherein each of the fourth electrodes is respectively disposed between each of the third electrodes and each of the second electrodes adjacent to each other, each of the fourth electrodes has a third center point, there is a ninth distance $G_9$ between the first center point and each of the third center points, and the ninth distance $G_9$ satisfies a following relation:

[Formula 4]

$$G_9 = \left[2df(n_e - n_o)\frac{a-3}{a}\right]^{\frac{1}{2}}. \quad (4)$$

14. The two-dimensional and three-dimensional stereoscopic switchable display device according to claim 13, wherein each of the second electrodes has a first width when the number of the equal parts equals 5, each of the third electrodes has a second width when the number of the equal parts equals 5, each of the fourth electrodes has a third width when the number of the equal parts equals 5, and each of the first widths, each of the second widths and each of the third widths in a ratio of 5:3:2 when the number of the equal parts equals 5.

15. The two-dimensional and three-dimensional stereoscopic switchable display device according to claim 14, wherein there is a tenth distance between each of the second electrodes and each of the fourth electrodes adjacent to each other, there is an eleventh distance between each of the fourth electrodes and each of the third electrodes adjacent to each other, there is a twelfth distance between each of the third electrodes and each of the first electrodes adjacent to each other, each of the tenth distances, each of the eleventh distances and each of the twelfth distances in a ratio of 2:1:1.

* * * * *